(12) United States Patent
Coulombe

(10) Patent No.: US 7,596,577 B2
(45) Date of Patent: Sep. 29, 2009

(54) METHODS AND SYSTEMS FOR SPECIFYING A USER INTERFACE FOR AN APPLICATION

(75) Inventor: Joseph S. Coulombe, Woodinville, WA (US)

(73) Assignee: Microsoft Corporation, Redmond, WA (US)

(*) Notice: Subject to any disclaimer, the term of this patent is extended or adjusted under 35 U.S.C. 154(b) by 116 days.

(21) Appl. No.: 11/104,922

(22) Filed: Apr. 12, 2005

(65) Prior Publication Data

US 2006/0230068 A1 Oct. 12, 2006

(51) Int. Cl.
*G06F 17/30* (2006.01)

(52) U.S. Cl. .................. 707/103 R; 707/9; 707/10; 707/102; 707/104.1; 707/100; 715/700; 717/113; 703/1

(58) Field of Classification Search ............. 707/102, 707/9, 10, 103 R, 100, 104.1; 715/700; 717/113; 703/1
See application file for complete search history.

(56) References Cited

U.S. PATENT DOCUMENTS

| | | | | |
|---|---|---|---|---|
| 5,721,912 A | * | 2/1998 | Stepczyk et al. | 707/102 |
| 5,870,545 A | * | 2/1999 | Davis et al. | 709/201 |
| 6,141,660 A | | 10/2000 | Bach et al. | 707/103 |
| 6,268,850 B1 | | 7/2001 | Ng | 345/333 |
| 6,286,017 B1 | * | 9/2001 | Egilsson | 715/503 |
| 6,366,927 B1 | * | 4/2002 | Meek et al. | 707/104.1 |
| 2002/0035450 A1 | * | 3/2002 | Thackston | 703/1 |
| 2002/0062317 A1 | * | 5/2002 | Wakai et al. | 707/100 |
| 2003/0106039 A1 | * | 6/2003 | Rosnow et al. | 717/100 |
| 2003/0212698 A1 | * | 11/2003 | Mani et al. | 707/102 |
| 2004/0186860 A1 | * | 9/2004 | Lee et al. | 707/200 |
| 2005/0114900 A1 | * | 5/2005 | Ladd et al. | 725/100 |
| 2005/0149868 A1 | * | 7/2005 | Katayama et al. | 715/700 |
| 2006/0085452 A1 | * | 4/2006 | Cope | 707/100 |

OTHER PUBLICATIONS

Research Report dated Nov. 13, 2008, in European Patent Application No. EP06738318.2.

* cited by examiner

*Primary Examiner*—Khanh B Pham
*Assistant Examiner*—Syling Yen
(74) *Attorney, Agent, or Firm*—Merchant & Gould, P.C.

(57) ABSTRACT

Systems and methods for generating and/or modifying a specification for an application. Data to be incorporated into the specification is stored in a database. The data is stored in the database according to a conceptual model that allows a specification generator application to generate the specification by making a series of queries to the database. Because the data is stored in a database, a change to a particular piece of data need only be made once, thereby simplifying maintenance and increasing accuracy of the specification.

15 Claims, 8 Drawing Sheets

METHODS AND SYSTEMS FOR SPECIFYING A USER INTERFACE FOR AN APPLICATION

TECHNICAL FIELD

Various embodiments relate to computer-implemented methods and systems, and more particularly to computer-implemented methods and systems for generating specifications for user interface for software applications.

BACKGROUND

Software application developers commonly write a specification that specifies the features, settings, interfaces etc. of the application. This specification can then be used by programmers to write the code to implement the application, and by other developers who might be writing other applications that can interoperate with the application.

Writing a specification for an application can be a complex task because applications might have a large number (hundreds or even thousands) of different features, functions, settings, and other associated data. A person writing a specification must keep track of all of this information. In addition, specifications typically undergo several revisions, which may require that a piece of information (e.g., a label, range, property, etc.) be revised throughout the specification. Thus, maintaining a specification can also be a difficult task.

SUMMARY

According to aspects of various described embodiments, systems and methods for generating and maintaining application specifications are provided. In one aspect, data to be incorporated into the specification is stored in a database. The data is stored in the database according to a conceptual model that allows a specification generator application to generate the specification by making a series of queries to the database. Because the data is stored in a database, a change to a particular piece of data need only be made once, thereby simplifying maintenance and increasing accuracy of the specification.

In another aspect, the systems and methods for generating and maintaining application specifications can include mechanisms to manage workflow in creating specifications. For example, mechanisms to control which users have permission to perform certain tasks with regard to the specification, require approvals, undergo review, etc. can be included in the systems.

In still another aspect, systems and methods for generating and maintaining application specifications can be incorporated into a web services model to allow multiple users to work on the specification and access the specification from external networks.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF ILLUSTRATED EMBODIMENTS

Embodiments are described more fully below with reference to the accompanying drawings, which form a part hereof. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Embodiments may be implemented as a computer process, a computing system (including mobile handheld devices) or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

Figure 1:
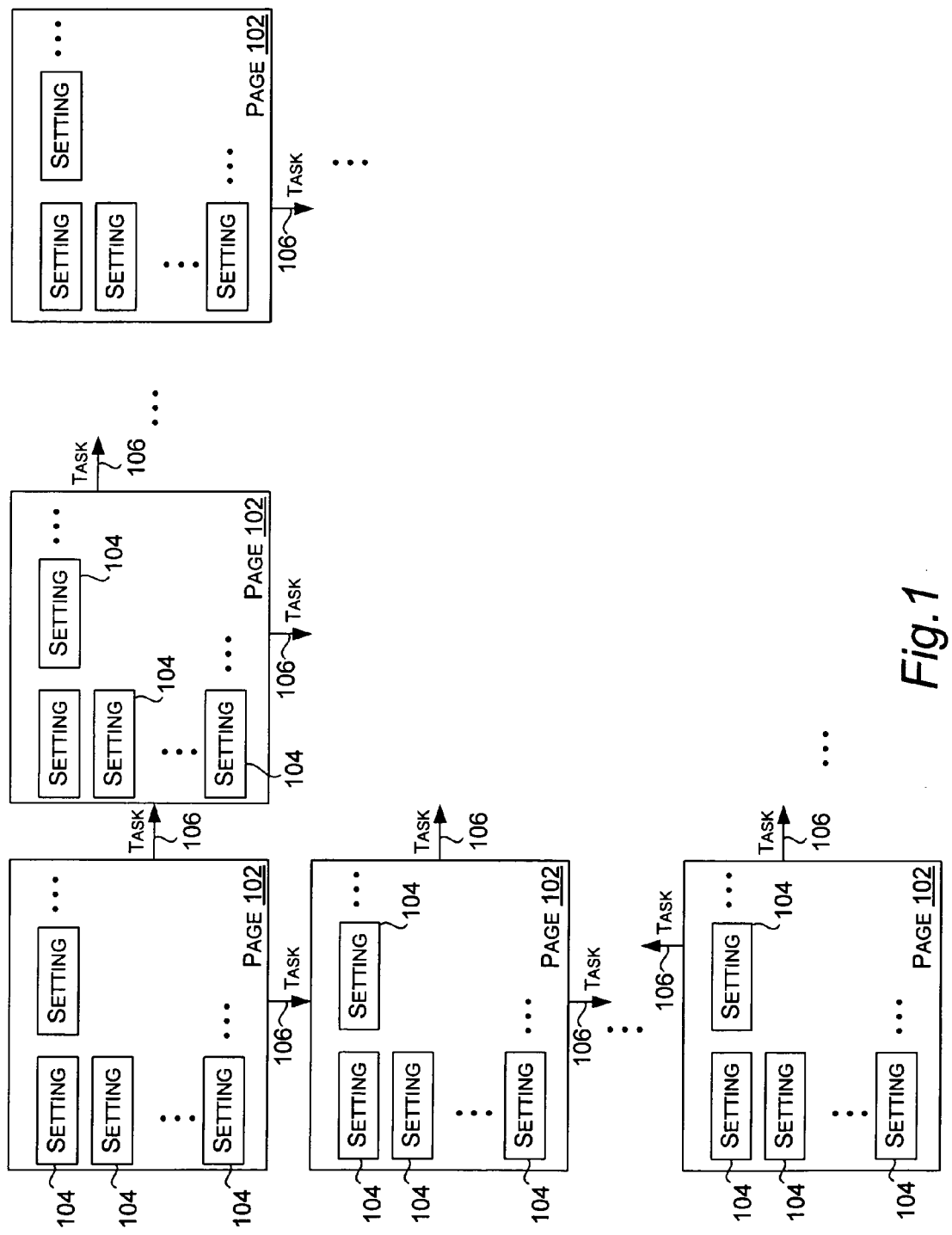
FIG. 1 is a diagram illustrating a conceptual model of a specification, according to an exemplary embodiment.

FIG. 1 illustrates a conceptual model 100 of a specification, according to an exemplary embodiment. In this embodiment, model 100 represents a UI specification having one or more pages 102, each having one or more settings 104. Pages 102 are pages in the UI itself rather than the pages of the UI specification and, unless indicated otherwise by the context or specifically, the term "page" is intended to refer to a page of a UI rather than of a specification. Each setting corresponds to a user interface control (e.g., a text box), which in turn corresponds to either a property in the configuration of a feature, or to a value from a monitoring system. A feature as used in this context is a function or capability of the application that can be utilized by a user via the UI. A value of a monitoring system as used in this context is a runtime value of an aspect of the application. For example, a "monitoring" value can be a value corresponding to or defined by an event generated by the application. Another example of a monitoring value can be the CPU bandwidth percentage being used by the application.

In addition to settings 104, pages 102 have one or more tasks 106 that define associations between pages. Tasks may be navigational in that they allow a user to navigate from one page to another. In addition, tasks may be more complex, requiring user input in addition to navigating between pages. For example, a set of tasks may implement a wizard (e.g., an interactive utility within an application that guides a user in performing a relatively complex operation, using a feature, or configuring a module or driver, etc.). Tasks can also correspond to actions (e.g., save, cancel changes, print, change the view of the data, etc.) that a user can ask the application to perform via the UI.

Figure 2:
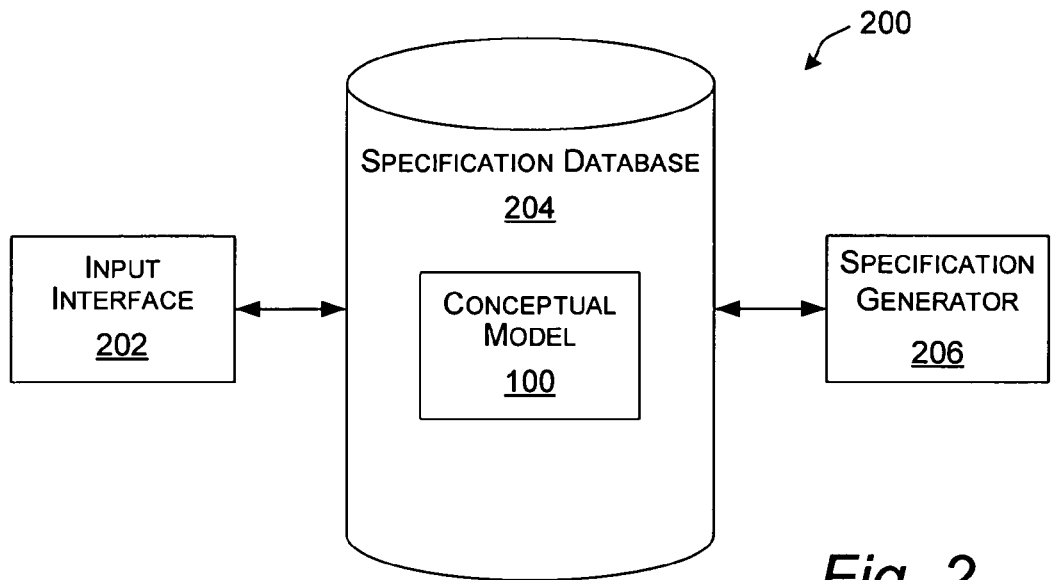
FIG. 2 is a block diagram illustrating a system to generate and maintain a specification for an application, according to an exemplary embodiment.

FIG. 2 illustrates a system 200 to generate and maintain a specification for an application, according to an exemplary embodiment. In this embodiment, system 200 includes an input interface 202, a specification database 204 and a specification generator 206.

In one embodiment, input interface 202 is an application that enables a user to enter data that is to be included in the specification. This data includes features to be implemented in the application, settings associated with the features, pages associated with the features, tasks associated with pages, application monitoring values, etc. One or more users can enter/edit data for an application specification using input interface 202. In one embodiment, input interface 202 is implemented using a web browser such as, for example, Internet Explorer® available from Microsoft Corporation, Redmond, Wash.

Specification database 204 is used to store the data for the application specification, which is provided by one or more users via input interface 202. In this embodiment, specification database 204 stores the data according to conceptual model 100 (FIG. 1). For example, specification database 204 can be a relational database that implements conceptual model 100. One such implementation of conceptual model 100 is described below in conjunction with FIG. 3. In one embodiment, specification database 204 is implemented using Microsoft SQL Server®, available from Microsoft Corporation. In other embodiments, specification database 204 can be an object oriented database or any suitable type of database that is configured to implement conceptual model 100.

Specification generator 206 is an application that enables a user to retrieve the specification data from specification database 204 and output a specification containing the retrieved data. In one embodiment, specification generator 206 uses the conceptual model to make queries of specification database 204 to retrieve particular data to facilitate generating the specification according to a desired specification format. Thus, one or more users (not necessarily the user that entered the specification data) can generate an application specification using specification generator 206. In one embodiment, specification generator 206 is implemented as a series of pages implemented using the ASP.Net framework, developed by Microsoft Corporation.

System 200 may also include a workflow feature (not shown) to control how data is entered into and viewed from specification database 204. The workflow data can define what permission(s) are needed to modify the settings associated with the feature, approvals needed to officially enter the feature into the specification, etc. In some embodiments, specification database 204 includes metadata defining the workflow, which specification database 204 enforces (e.g., denying permission to enter/edit data, view data, etc.). In some embodiments, the permissions are directed to individual UI designers/writers. For example, a particular writer may only have permission to enter/edit field label names in a selected foreign language (i.e., translate the English language names into corresponding field label names in the foreign language). In some embodiments, the workflow feature is omitted for systems in which it is not needed or desired.

Figure 3:
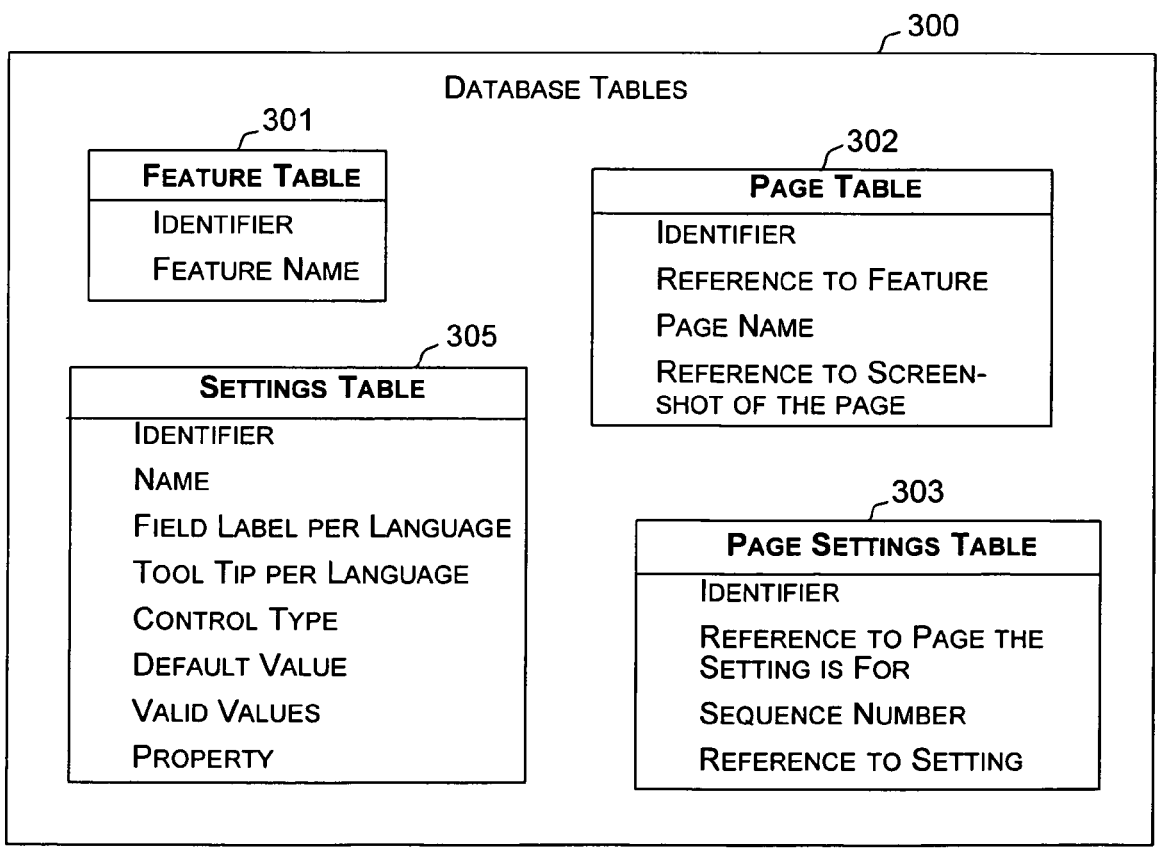
FIG. 3 is a diagram illustrating tables of a relational database used to implement the conceptual model of FIG. 1, according to an exemplary embodiment.

FIG. 3 illustrates tables 300 of a relational database used to implement conceptual model 100 (FIG. 1), according to an exemplary embodiment. In this embodiment, the database includes a feature table 301, a page table 302, a page settings table 303, and a settings table 305.

Feature table 301 contains a list of features of the application for which specification data is to be stored. In this embodiment, feature table 301 includes a column for an identifier of the feature (feature identifier), and a column for the name of the feature (feature name). The feature name is "user friendly" in that it is one that a user can easily read and understand, whereas the feature identifier is a unique identifier for the feature that may not spell out a word or name.

Page table 302 contains a list of the pages, organized by feature. In this embodiment, page table 302 includes a column for an identifier of the page (page identifier); a column for a reference to the feature that the page is for (feature reference); a column for a name of the page (page name); and a column for a reference to a screenshot of the page (screenshot reference). The page identifier is a unique identifier for a page. The feature reference column contains a relationship to a feature of feature table 301. The page name is a "user-friendly" name for the page. The screenshot reference contains a pointer to the location of a screenshot of the page that is to be included in the specification.

Page settings table 303 contains a list of the settings contained on each page. In this embodiment, page settings table 303 includes a column for an identifier for the setting (setting identifier); a column for a reference to the page the setting is for (page reference); a column for a sequence number; and a column for a reference to a setting (setting reference). The setting identifier is a unique identifier for the setting. The page reference contains a relationship to a page of page table 302. The sequence number is used to determine the order or sequence in which settings are to be displayed on the page. The setting reference contains a relation to a setting of settings table 305.

Settings table 305 contains a list of all of the settings in the application. In this embodiment, settings table 305 includes a column for an identifier for the setting (setting identifier); a column for a name of the setting (setting name); one or more columns for a field label (i.e., one for each language in which the specification can be generated); one or more columns for a tool tip (i.e., one for each language in which the specification can be generated); a column for a control type of the setting; a column for a default value for the setting; a column for valid values for the setting; and a column for a property of the setting. The setting identifier and the setting name are as described above for page settings table 303. The field label contains the text (in a particular language) that appears proximate to a setting in the UI. The tool tip contains the text (in a particular language) that appears when the mouse hovers over the setting. The control type contains the type of UI control used to represent the value of the setting (e.g., a text box, a button, a slide, etc.). The default value contains a value for the setting if the user does not enter one. The valid values contain a range or list of values that are valid for that setting (e.g., a range of numbers, "yes" or "no", etc.). The current value contains the value of the setting as it is referred to in the feature's configuration system.

Although some tables of a relational database to implement conceptual model 100 are described above, in other embodiments, more tables may be used to implement the conceptual model.

Figure 3A:
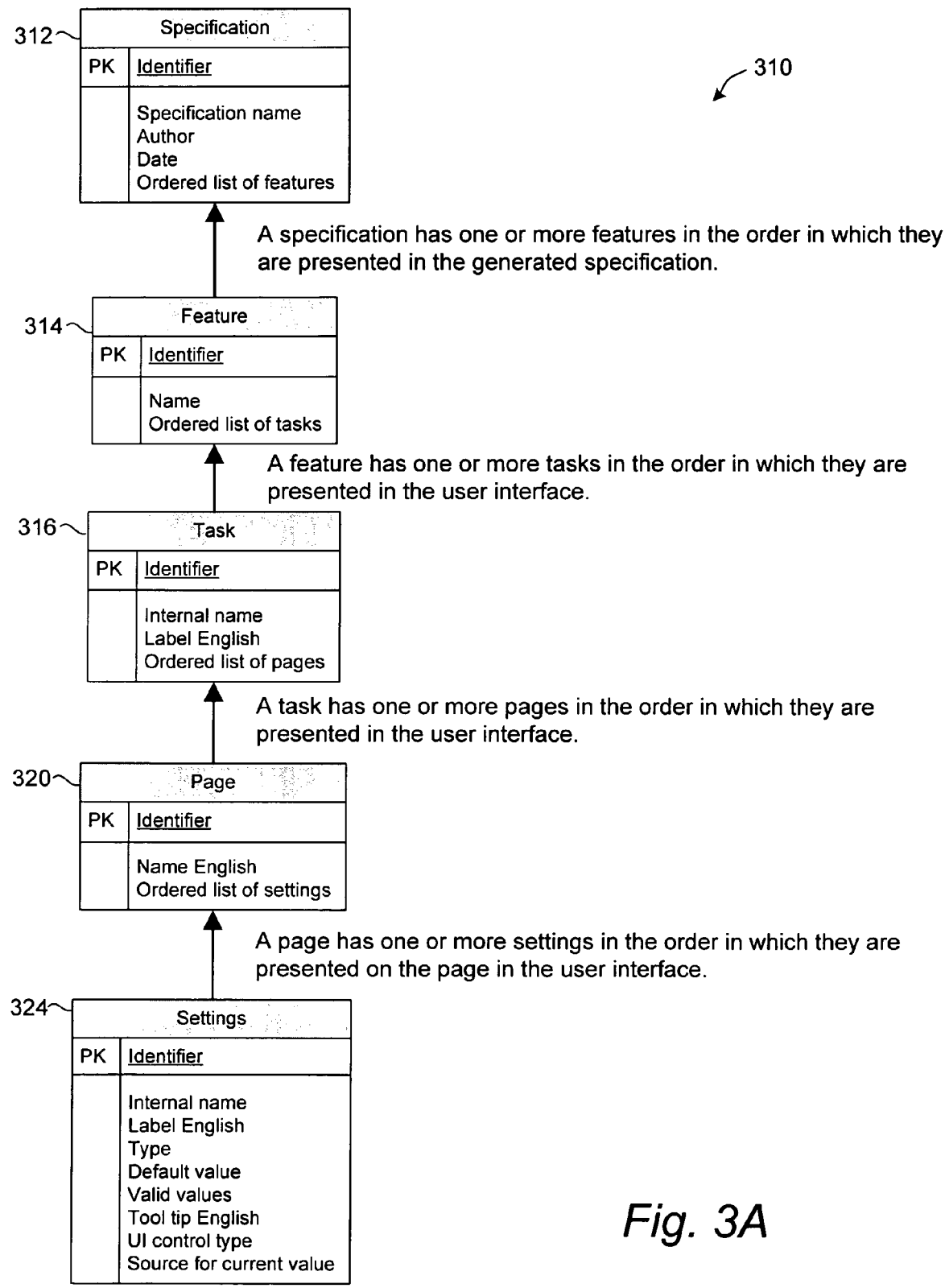
FIG. 3A is an entity-relationship (ER) diagram illustrating a schema of the relational database of FIG. 3, according to one embodiment.

FIG. 3A is an ER diagram illustrating a schema 310 of a relational database that can be used in implementing conceptual model 100, according to one embodiment. This relational database has additional tables compared to tables 300 (FIG. 3) but also implements the conceptual model. In this embodiment, schema 310 includes a Specification entity 312, a Feature entity 314, a Task entity 316, a Pages entity 320, and a Settings entity 324. Although the ER diagram of FIG. 3A defines the attributes of each entity and the relationship between other entities, for completeness, these entities are described below according to one embodiment. Each of these entities has a unique identifier denoted "Identifier" which is referred to by other entities as necessary.

In this embodiment, Specification entity 312 is used to store general information about a UI specification such as the author, date, etc. and a list of references to the unique identifiers of the features to be included in the specification in the order they are to be presented when the specification is generated. This is denoted as "Ordered list of features"

Feature entity 314, in this embodiment, is used to store information about features of the application. The intent of the feature entity is to group related tasks together so that they make sense to the customer in the user interface. In this embodiment, feature entity 314 includes an attribute to store a user-friendly name for the feature, denoted "Name" and a list of references to the unique identifiers of the user interface tasks (in the order in which they are presented in the user interface) that make up the feature, denoted as "Ordered list of tasks."

Task entity 316 is used to store information about tasks. In this embodiment, Task entity 316 includes attributes for storing for a particular task:

(a) a user-friendly name for a task (used internally by the code), denoted "Internal name";

(b) text in English labeling a task and displayed in the UI, denoted "Label English" (in other embodiments, there can be attributes for labels in other languages); and (c) a list of references to the unique identifiers of the user interface pages that are displayed by the feature. This list is ordered to show the sequence in which the pages are displayed in the user interface. A task will have at least one user interface page. If the task is performed using a user interface wizard, then a sequence of pages will be presented to the customer, and number of pages and their order is defined in this list. The list is denoted as "Ordered list of pages."

Pages entity 320 is used to store information about pages used in UI specifications. In this embodiment, Pages entity 320 includes:

(a) text in English labeling the page displayed in the UI, denoted as "Name English" (in other embodiments, there can be attributes for names in other languages): and (b) a list of references to the unique identifiers of the settings presented on the page, denoted as "Ordered list of settings." This list is ordered so that it defines the order (generally from top to bottom) in which the settings are presented on the user interface page. Settings are generally presented in as a list of labels and user interface controls. This order is also the order used to defined the tab sequence, that is the order in which the cursor focus will change on the user interface page each time the customer presses the "Tab" key on the computer keyboard.

Settings entity 324 represents individual user interface controls on a page in this embodiment, it includes attributes for storing:

(a) a user-friendly name for a setting (used internally by the code), denoted "Internal Name";

(b) text in English labeling a setting and displayed in the UI, denoted "Label English" (in other embodiments there can be labels in other languages);

(c) a data type (e.g., Boolean, string, etc.) defined for data used by the setting, denoted "Type";

(d) a value automatically entered for a setting that can be changed by the user of the UI, denoted "Default Value";

(e) a range of values that a setting may validly have, denoted "Valid Values";

(f) text in English that appears when the user hovers a cursor over a setting (e.g., a UI control), denoted "Tool Tip English" (in other embodiments there can be tool tips in other languages);

(g) a value indicating a type of UI control (e.g., a button, a slide, etc.), denoted "UI Control Type"; and (h) a reference to information stored in the database system that is associated with a setting (e.g., a name of a column of a table in the database, or the name of a variable in a configuration system), denoted "Source of current value".

The relationships between the above entities are described below according to one embodiment. In Specification entity 312, each instance of a specification "Ordered list of features" attribute must have a relationship with at least one feature "Identifier" instance defined in Feature entity 314. That is, each specification must have one or more features (i.e., a mandatory one to many relationship).

In Feature entity 314, each instance of a feature "Ordered list of tasks" attribute may be associated with one or more instances of the task "Identifier" attribute of Task entity 316. That is, each feature must have at least one task (i.e., a feature must exist and has a one to many relationship with tasks).

In Task entity 316, each instance of a task "Ordered list of pages" attribute must be associated with one or more instances of the page "Identifier" attribute of Pages entity 320. That is, a task must have at least one page (i.e., a mandatory one to many relationship with pages).

In Pages entity 320, each instance of a page "Ordered list of settings" attribute may be associated with one or more instances of the settings "Identifier" attribute of Settings entity 324. That is, each page entity must have at least one setting (i.e., i.e., a mandatory one to many relationship with settings).

Schema 310 can be used by one of ordinary skill in the art to implement a UI specification database that includes tables such as tables 300 (FIG. 3). For example, by forming a table for each entity of schema 310 (in which each instance of the entity serves as a row of the table and the entity's attributes serve as columns of the table), a relational database can be implemented. Further, a normalization process may be performed on schema 310 to create other embodiments having a different number of entities and relationships but having the substantially same functionality.

Figure 4:
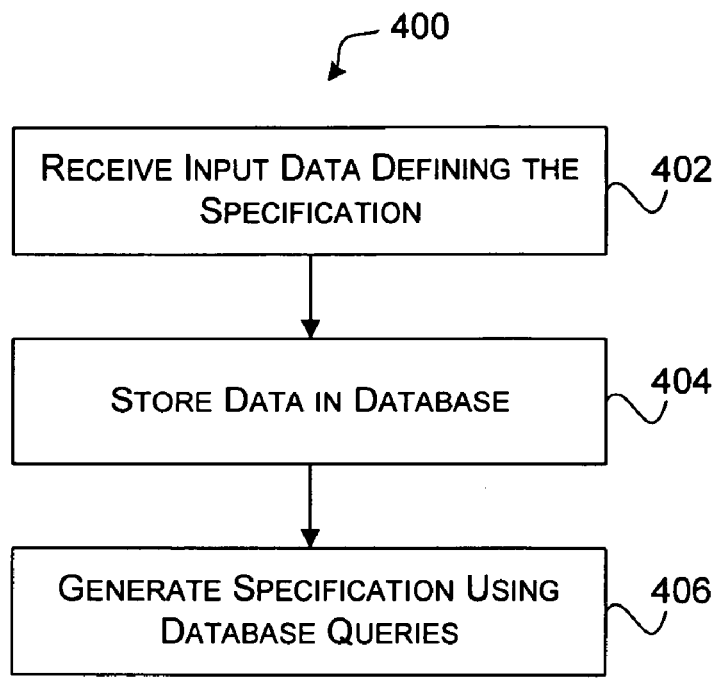
FIG. 4 is a flow diagram illustrating operational flow in generating an application specification, according to an exemplary embodiment.

FIG. 4 illustrates operational flow 400 in generating an application specification, according to an exemplary embodiment. Operational flow 400 may be performed in any suitable computing environment. For example, operational flow 400 may be executed by system 200 of FIG. 2 and, therefore, the description of operational flow 400 may refer to at least one of the components of FIG. 2. However, any such reference to a component of FIG. 2 is for descriptive purposes only, and it is to be understood that the implementation of FIG. 2 is a non-limiting environment for operational flow 400.

At a block 402, a user inputs or enters data used in generating a specification for an application. In one embodiment, a user can use an application such as input interface 202 (FIG. 2) to enter specification data. An embodiment of this operation is described below in more detail in conjunction with FIG. 5.

At a block 404, the entered data is stored in a database. In one embodiment, the entered data is stored in a specification database. In one embodiment, the specification database is a relational database that is configured to implement conceptual model 100 (FIG. 1). In other embodiments, the specification database is object-oriented database configured to implement conceptual model 100. For example, in one embodiment, the specification database is implemented using specification database 204 as described above in conjunction with FIG. 2.

At a block 406, a specification is generated using data stored in the database. In one embodiment, a user can request generation of a specification using an application such as specification generator 206 (FIG. 2). An embodiment of this operation is described in more detail below in conjunction with FIG. 6.

Figure 5:
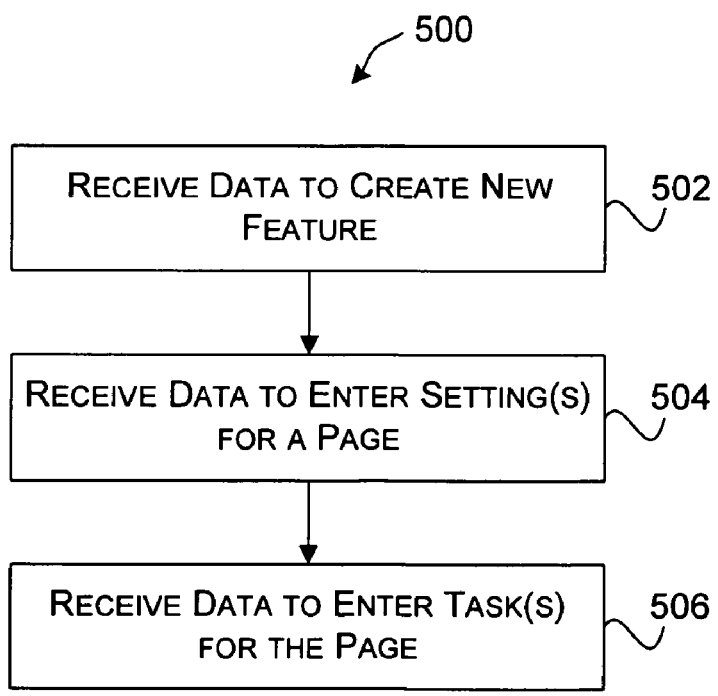
FIG. 5 is a flow diagram illustrating operational flow in entering data for a new feature of an application specification, according to an exemplary embodiment.

FIG. 5 illustrates operational flow 500 in entering data for a new feature of an application specification, according to an exemplary embodiment. For example, operational flow 500 may be used to implement one embodiment of block 402 (FIG. 4). Operational flow 500 may be performed in any suitable computing environment. For example, operational flow 500 may be executed by system 200 of FIG. 2 and, therefore, the description of operational flow 500 may refer to at least one of the components of FIG. 2. However, any such reference to a component of FIG. 2 is for descriptive purposes only, and it is to be understood that the implementation of FIG. 2 is a non-limiting environment for operational flow 500.

At a block 502, data is received for a new feature of an application to be created in the specification. In one embodiment, a user can create a new feature in the specification by entering the new feature using an application such as, for example, input interface 202 (FIG. 2). The application can prompt the user to enter a name for the feature, and one or more pages associated with that feature. As previously described in conjunction with FIG. 3, each page can have a screenshot that is to be part of the specification. In one embodiment, the user can enter a screenshot for each of the one or more pages associated with the feature.

At a block 504, data is received for one or more settings to be entered for the one or more pages associated with the feature. In one embodiment, a user can use an application such as, for example, the aforementioned input interface 202 to enter settings data. As previously described in conjunction with FIG. 3, a setting can have an identifier, a name, one or more field labels, a control type, a default value, a range of valid values, and a property. For each setting, a user creating the setting would enter data for such attributes.

At a block 506, data is received for one or more tasks to be entered for the one or more pages associated with the feature. In one embodiment, a user can use an application such as, for example, the aforementioned input interface 202 to enter tasks data. As previously described in conjunction with FIG. 1, tasks are used to define associations between pages (e.g., navigational associations, wizards, etc.) and actions (e.g., save, cancel changes, print, change the view of the data, etc.).

Although operational flow 500 describes operations for creating a new feature in the specification, the flow is substantially similar to modify data of a feature already included in the specification. Basically, the words "create" and "enter" in blocks 502, 504, 506 and 508 can be replaced with "edit" to describe an operational flow to modify data associated with a feature.

Figure 6:
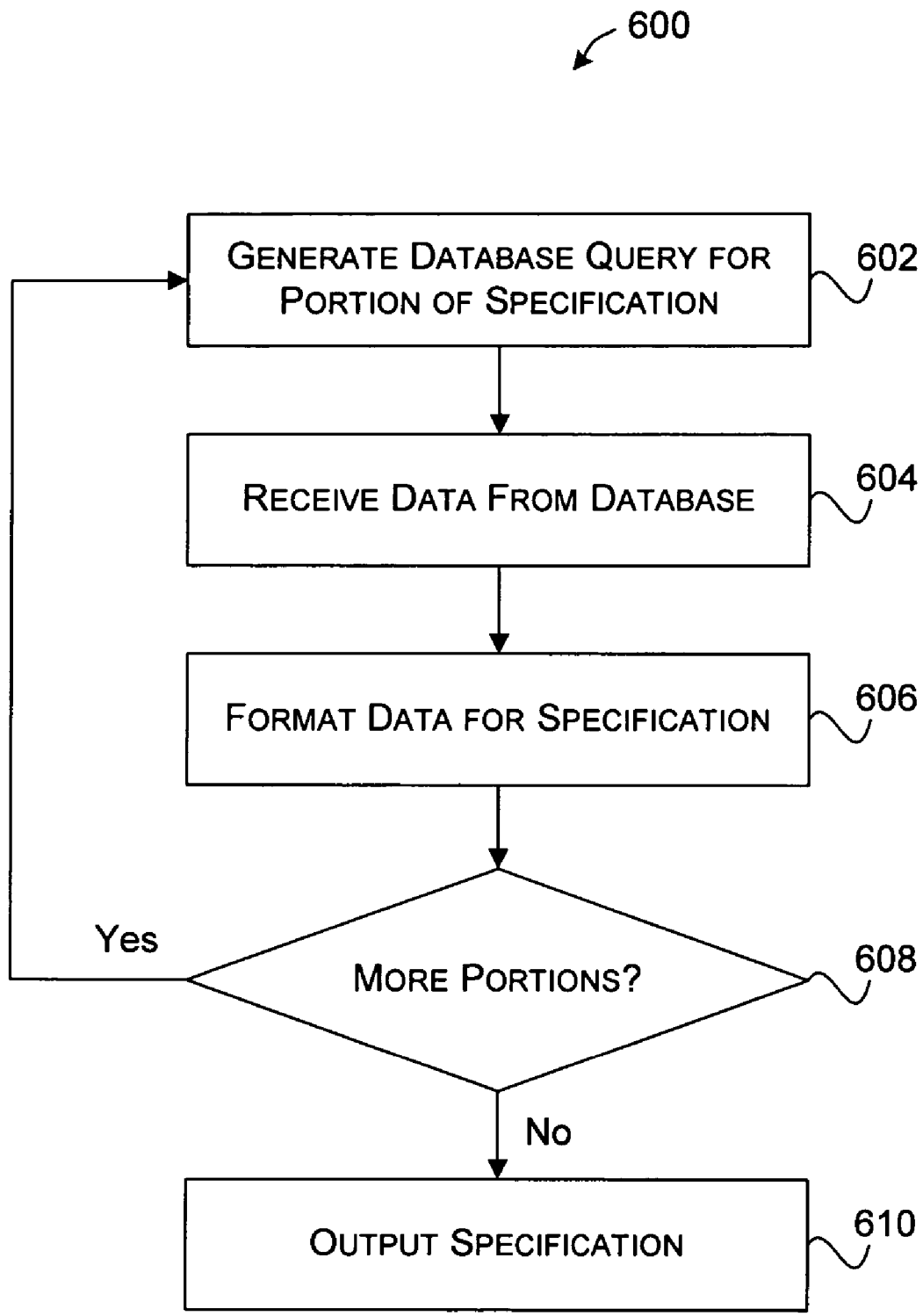
FIG. 6 is a flow diagram illustrating operational flow in generating an application specification, according to an exemplary embodiment.

FIG. 6 illustrates operational flow 600 in generating an application specification, according to an exemplary embodiment. For example, operational flow 600 may be used to implement one embodiment of block 406 (FIG. 4). Operational flow 600 may be performed in any suitable computing environment. For example, operational flow 600 may be executed by system 200 of FIG. 2 and, therefore, the description of operational flow 600 may refer to at least one of the components of FIG. 2. However, any such reference to a component of FIG. 2 is for descriptive purposes only, and it is to be understood that the implementation of FIG. 2 is a non-limiting environment for operational flow 600.

At a block 602, a database query is generated to create a portion of the specification. In one embodiment, a user can generate or output the specification using an application such as, for example, specification generator 206 (FIG. 2), which generates the query and submits it to a specification database such as specification database 204 (FIG. 2). In one embodiment, the application can be configured to output only the portion or portions that the user has permission to output.

At a block 604, the data resulting from the query is received from the specification database. In one embodiment, the aforementioned specification generator 206 receives the data resulting from the query.

At a block 606, the received data is formatted for incorporation into the specification. In one embodiment, the aforementioned specification generator 206 formats the received data. For example, in one embodiment, the format includes presenting the name of the feature as a heading for the page associated with the feature, followed by a screenshot of the page, which is then followed by a listing of the settings and other associated data (e.g., tasks, permissions, approvals, etc). Of course, different formats can be used in other embodiments.

At a block 608, it is determined whether there are more portions of the specification to output or generate. In one embodiment, the aforementioned specification generator 206 determines whether more portions are to be outputted. For example, if the entire specification is to be generated, specification generator 206 would determine whether all of the portions of the specification have been formatted.

Figure 7:
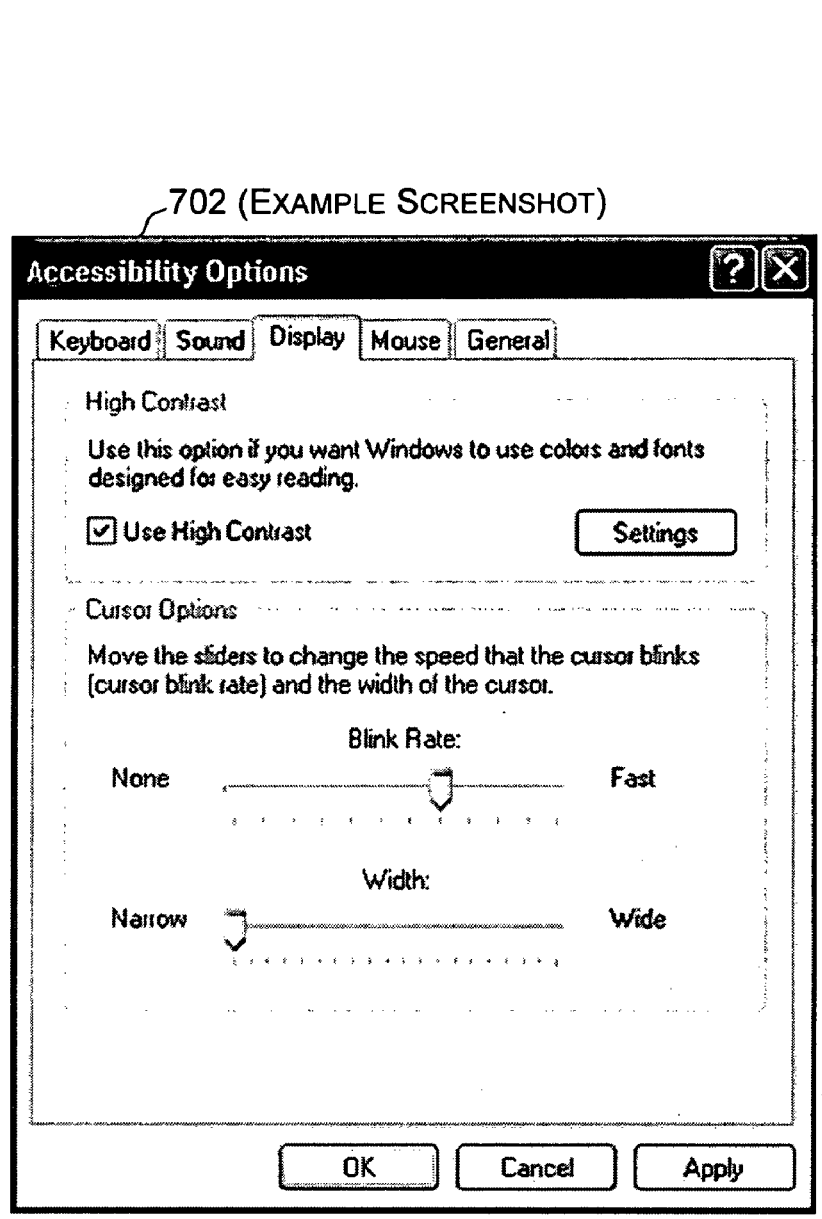
FIG. 7 is a diagram illustrating an example of a portion of a user interface (UI) specification that is generated for a page of the UI, according to an exemplary embodiment.

If at block 608 it is determined that there are more portions to be formatted, the operational flow returns to block 602. However, if at block 608 it is determined that there are no more portions to be formatted, the operational flow proceeds to a block 610, at which the formatted portions are combined and outputted in a document. The document can then be displayed to the user, printed out, etc. An example of a portion is illustrated in FIG. 7. In this example, the portion specifies a page 700 of a UI for the application. This exemplary page 700 includes a screenshot 702 and a listing 704 of settings and associated data such as described above in conjunction with FIG. 3. Other portions of the specification would specify other pages of the UI for the application.

Figure 8:
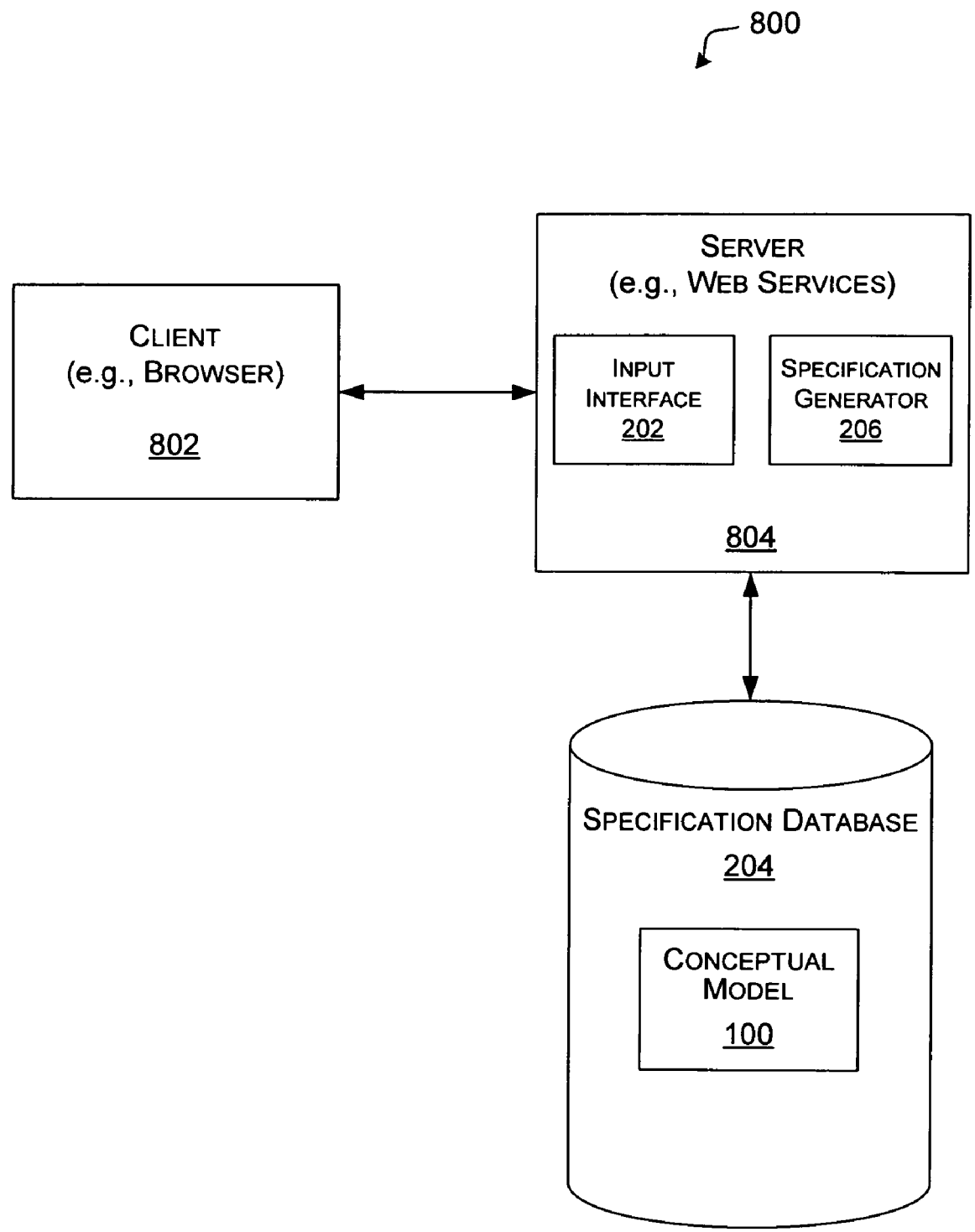
FIG. 8 is a diagram illustrating a web service-based system for generating and maintaining an application specification, according to an exemplary embodiment.

FIG. 8 illustrates a web service-based system 800 for generating and maintaining an application specification, according to an exemplary embodiment. In this embodiment, system 800 includes a client 802, a server 804, and specification database 204 implementing conceptual model 100, which is previously described in conjunction with FIG. 2.

In one embodiment, client 802 is a browser that can call services provided by server 804 to enter and/or modify specification data in specification database 204, and output or generate a specification or portions of a specification using data stored in specification database 204. These services are represented as input interface 202 and specification generator 206 in server 804. In one embodiment, these services are implemented as pages according to the ASP.Net framework developed by Microsoft Corporation. This embodiment allows users in disparate locations to concurrently access and work on the specification.

Illustrative Operating Environment

Figure 9:
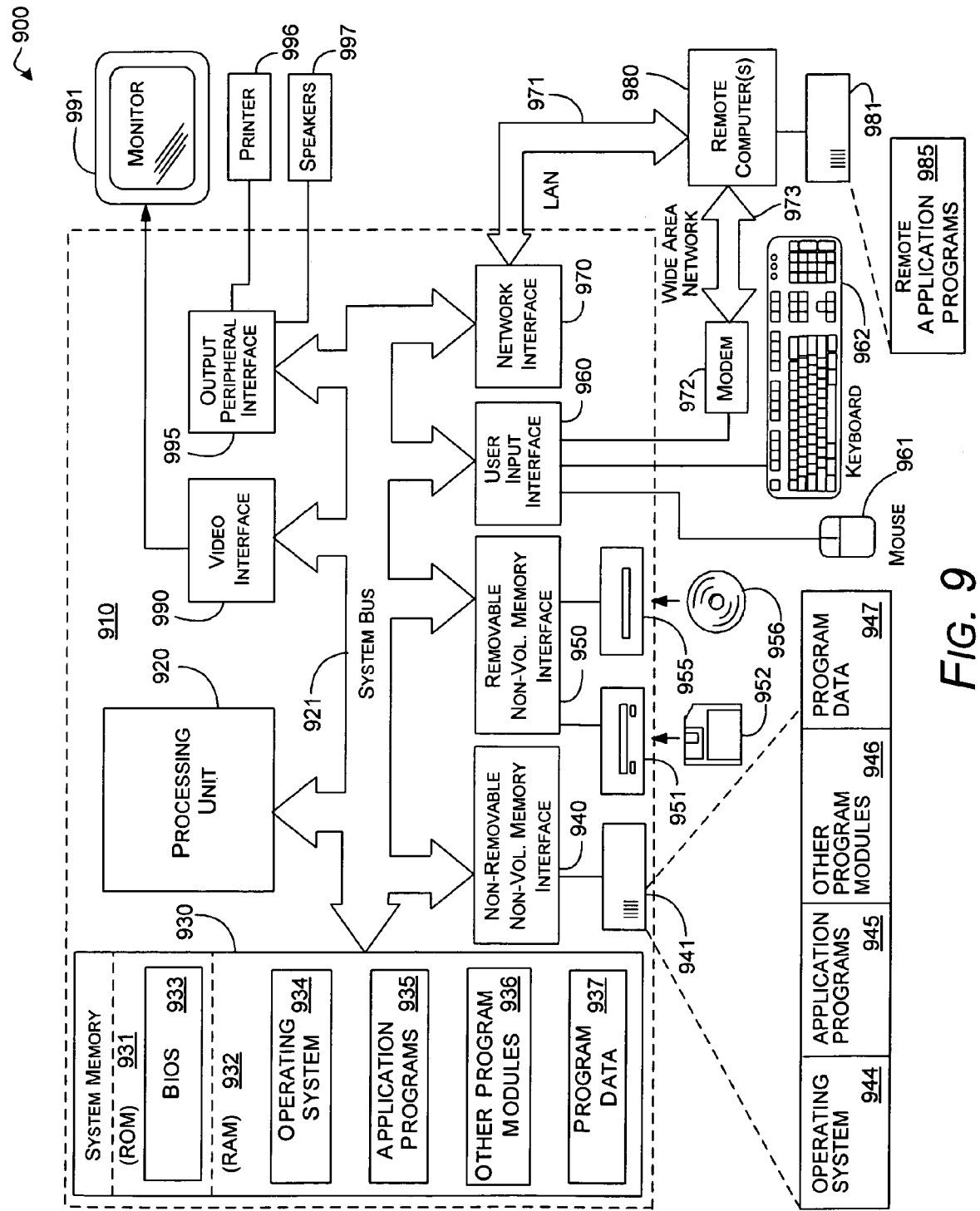
FIG. 9 is a block diagram illustrating a computing environment that may be used according to exemplary embodiments.

FIG. 9 illustrates an example of a suitable computing system environment 900 on which embodiments may be implemented. The computing system environment 900 is only one example of a suitable computing environment and is not intended to suggest any limitation as to the scope of use or functionality of the embodiments. Neither should the computing environment 900 be interpreted as having any dependency or requirement relating to any one or combination of components illustrated in the exemplary operating environment 900.

Embodiments are operational with numerous other general purpose or special purpose computing system environments or configurations. Examples of well known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Embodiments may also be practiced in distributed computing environments where tasks are performed by remote processing devices that are linked through a communications network. In a distributed computing environment, program modules may be located in both local and remote computer storage media including memory storage devices.

With reference to FIG. 9, an exemplary system for implementing various embodiments includes a general-purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through an non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 990.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

Although embodiments have been described in language specific to structural features and/or methodological steps, it is to be understood that the invention defined in the appended claims is not necessarily limited to the specific features or steps described. Rather, the specific features and steps are disclosed as forms of implementing the claimed invention. Since many embodiments can be made without departing from the spirit and scope of the invention, the invention resides in the claims hereinafter appended.

What is claimed is:

1. A computer-implemented method for providing a specification for an application, the computer-implemented method comprising:

receiving data inputted by a user to be used in the specification;

wherein the specification describes what is to be included in an application and the inputted data includes workflow data related to an approval needed by a user to associate a feature with the specification in a database, wherein the workflow data includes permissions enforced by the database, and the feature is associated with an ordered list of tasks to be performed by the application;

wherein the database comprises a relational database that includes a table of settings defined for all of the pages in the specification, and a table of page settings with relationships to the settings table;

storing the data in the database, wherein the database stores the feature and at least one setting, the at least one setting specifying an input user interface control and an attribute in association with the at least one setting, the attribute including a valid range of input values for the input user interface control, wherein the application is thereby configured to only accept values within the valid range of input values in the input user interface control;

generating a database query for a portion of the specification associated with the stored data received from the user;

querying the database for the portion of the specification;

receiving data from the database in response to the query;

formatting the data accessed from the database by including a name of the feature and a name of the at least one setting in the formatted data and presenting the name of the feature in a heading of a page of the application; and incorporating the formatted data into the specification.

2. The computer-implemented method of claim 1 wherein the inputted data includes data associated with a page of a user interface (UI).

3. The computer-implemented method of claim 2 wherein the inputted data includes settings for the page.

4. The computer-implemented method of claim 2 wherein the inputted data includes tasks associated with the page.

5. The computer-implemented method of claim 2 wherein the inputted data includes additional workflow data associated with the page.

6. The computer-implemented method of claim 5 wherein the additional workflow data includes data related to permission granted for modifying the specification.

7. The computer-implemented method of claim 5 wherein the additional workflow data includes data related to approval of portions of the specification.

8. The computer-implemented method of claim 1 wherein the method is implemented using a web-services model.

9. A tangible computer-readable storage medium having stored thereon instructions that when executed by a computer perform operations implementing the method of claim 1.

10. A system to generate a specification for an application, the system comprising:

at least one processor;

at least one memory;

an input interface to receive data inputted by a user to be used in the specification;

wherein the specification describes what is to be included in the application and the inputted data includes workflow data related to an approval needed by a user to associate a feature with the specification in a specification database, wherein the workflow data includes permissions enforced by the specification database, and the feature is associated with an ordered list of tasks to be performed by the application;

wherein the specification database comprises a relational database that includes a table of settings defined for all of the pages in the specification, and a table of page settings with relationships to the settings table;

wherein the specification database stores the feature and at least one setting, the at least one setting specifying an input user interface control and an attribute in association with the at least one setting, the attribute including a valid range of input values for the input user interface control, wherein the application is thereby configured to only accept values within the valid range of input values in the input user interface control;

a specification generator to automatically generate at least a portion of the specification using data accessed from the specification database;

wherein generating at least a portion of the specification includes formatting the data accessed from the database by including a name of the feature and a name of the at least one setting in the formatted data and presenting the name of the feature in a heading of a page of the application; and incorporating the formatted data into the specification.

11. The system of claim 10 wherein the inputted data includes data associated with a page of a user interface (UI).

12. The system of claim 11 wherein the inputted data includes one or more of settings, tasks, or workflow data associated with the page.

13. A tangible computer-readable storage medium having stored thereon instructions that when executed by a computer perform operations implementing the system of claim 10.

14. A system for generating a specification for an application, the system comprising:

at least one processor;

at least one memory;

means for receiving data inputted by a user to be used in the specification;

wherein the specification describes what is to be included in an application and the inputted data includes workflow data related to an approval needed by a user to associate a feature with the specification in a database, wherein the workflow data includes permissions enforced by the database, and the feature is associated with an ordered list of tasks to be performed by the application;

wherein the database comprises a relational database that includes a table of settings defined for all of the pages in the specification, and a table of page settings with relationships to the settings table;

means for storing the data, the means for storing comprising a database, wherein the database includes a feature and a setting, the setting specifying a user interface control and an attribute in association with the setting, the attribute including a valid range of input values for the user interface control, wherein the application is thereby configured to only accept values within the valid range of input values in the input user interface control;

means for generating a database query for a portion of the specification associated with the stored data;

means for querying the database for the portion of the specification associated with the stored data;

means for receiving data from database in response to the query; and means for formatting the data accessed from the database by including a name of the feature and a name of the at least one setting in the formatted data and presenting the name of the feature in a heading of a page of the application; and means for incorporating the formatted data into the specification.

15. The system of claim 14 wherein the inputted data includes one or more of settings, tasks, or workflow data associated with the page.

* * * * *